April 14, 1931. C. D. BIRKS ET AL 1,800,243
COCK AND VALVE
Filed Nov. 15, 1929
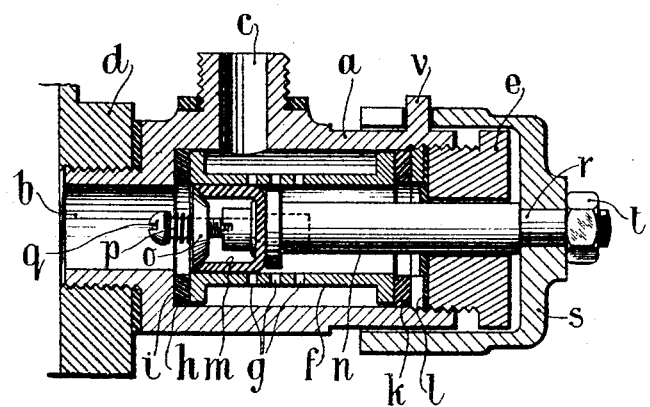
Inventors
CYRIL DOUGLAS BIRKS,
NORMAN ARTHUR BIRKS, Patented Apr. 14, 1931

1,800,243

UNITED STATES PATENT OFFICE

CYRIL DOUGLAS BIRKS AND NORMAN ARTHUR BIRKS, OF LONDON, ENGLAND

COCK AND VALVE

Application filed November 15, 1929. Serial No. 407,346.

This invention relates to piston release valves of the type which can be instantaneously operated to permit air or the like, under pressure, to be passed through them.

The object of the present invention is to provide a simple and efficient construction of valve of this type.

A further object of the present invention is to provide an improved valve of this type for the purpose of cleansing, or removing obstructions from pipes, and for other purposes where a sudden discharge of compressed fluid is desired.

The accompanying drawing is a vertical section of one way of putting the present invention into practice.

Referring to the drawing, the device comprises a barrel $a$ provided with inlet $b$ and outlet $c$. The inlet $b$ is internally threaded to engage the outlet $d$ from a compressor or other source of live air, and the other end of the barrel $a$ is threaded internally to engage a plug $e$ which closes this end of the barrel. A tube $f$ flanged at its ends is disposed inside the barrel $a$ between the inlet $b$ and the plug $e$, and is provided with perforations $g$ about its medial portion. A leather washer $h$ is placed between the one flanged end of the tube $f$ and an abutment $i$ formed in the barrel $a$; and a rubber washer $k$ and fibre washer $l$ are placed between the other flanged end of the tube $f$ and the plug $e$.

Located within the tube $f$ is a piston formed by a cup leather $m$ connected to a rod $n$ which extends through the tube $f$ and through a boring in the plug $e$. The sides of the cup leather are held against the inner surface of the tube $f$ by a spacing disc $o$ held firmly against the leather by a spring $p$ coiled around the screw $q$. The free end of the rod $n$ is restricted in diameter at $r$, the restricted portion passing through a boring in the end cap $s$ and engaging a nut $t$. The cap $s$ is held in position for holding the valve closed by a bayonet joint $v$.

In use, in order to pass compressed fluid through the device, the cap $s$ is released by being rotated, whereupon the piston $m$ and rod $n$ move outwards instantaneously under the action of the compressed air or the like entering through the inlet $b$, uncovering the perforations $g$, through which the charge of compressed air streams on its way to the outlet $c$.

What we claim and desire to secure by Letters Patent is:—

1. An instantaneous piston release valve comprising a cylindrical casing, an inlet to the casing, an outlet from the casing, a tube disposed in the casing in a fixed position relatively to the casing, perforations in the tube between the inlet and the outlet, a plug closing one end of the casing, a boring in the plug, a piston comprising a cup leather fixed to a piston rod, said piston slidably mounted within the said tube and normally shutting off communication between the inlet and said perforations, and said rod slidable in said boring, an end cap secured to the piston rod and a bayonet joint between the end cap and the casing adapted to releasably hold the valve in closed position.

2. A valve according to claim 1, further comprising packings suitably disposed between the inlet and the perforations in the tube to make an airtight joint when the piston is held in its operative position.

In testimony whereof, we affix our signatures.

CYRIL DOUGLAS BIRKS.
NORMAN ARTHUR BIRKS.